US011636796B2

United States Patent
Shan et al.

(10) Patent No.: US 11,636,796 B2
(45) Date of Patent: Apr. 25, 2023

(54) SUBJECT SEGMENTATION FOR MOTION CONTROL AND TEXTURED DISPLAY

(71) Applicant: Black Sesame International Holding Limited, Santa Clara, CA (US)

(72) Inventors: Jizhang Shan, Los Gatos, CA (US); Tiecheng Wu, Singapore (SG); Fangwen Tu, Singapore (SG); Bo Li, Singapore (SG); Jin Xu, Singapore (SG)

(73) Assignee: Black Sesame Technologies Inc., San Jose, CA (US)

( * ) Notice: Subject to any disclaimer, the term of this patent is extended or adjusted under 35 U.S.C. 154(b) by 92 days.

(21) Appl. No.: 17/110,561

(22) Filed: Dec. 3, 2020

(65) Prior Publication Data

US 2022/0180790 A1    Jun. 9, 2022

(51) Int. Cl.
*G09G 3/20* (2006.01)
*G09G 5/02* (2006.01)
*G06T 7/90* (2017.01)
*G06T 7/20* (2017.01)

(52) U.S. Cl.
CPC ............. *G09G 3/2003* (2013.01); *G06T 7/20* (2013.01); *G06T 7/90* (2017.01); *G09G 5/026* (2013.01)

(58) Field of Classification Search
CPC ..................................................... G09G 3/2003
See application file for complete search history.

(56) References Cited

U.S. PATENT DOCUMENTS

| 11,087,513 | B1* | 8/2021 | Duan ................... G06T 11/60 |
| 2017/0287107 | A1* | 10/2017 | Forutanpour ........... G06T 19/20 |
| 2020/0084354 | A1* | 3/2020 | Agrawal ............ H04N 5/23232 |
| 2021/0073953 | A1* | 3/2021 | Lee ...................... G06N 3/0454 |

* cited by examiner

*Primary Examiner* — Gustavo Polo
(74) *Attorney, Agent, or Firm* — Timothy T. Wang; Ni, Wang & Massand, PLLC

(57) ABSTRACT

A method of motion control and textured display, comprising, receiving an image, extracting an initial mask of a subject of interest from the image, segmenting the image into the initial mask and a background, determining a color texture of the initial mask, estimating motion of the initial mask to a new mask and merging the new mask and the background into a merged image.

3 Claims, 9 Drawing Sheets

SUBJECT SEGMENTATION FOR MOTION CONTROL AND TEXTURED DISPLAY

BACKGROUND

Technical Field

The instant disclosure is related to subject segmentation within a frame and specifically to providing subject segmentation for motion control and textured display.

Background

Current motion sensing methods relate mainly to wearable devices where imbedded sensors are physically attached to bodies and the relative movement of each sensor is determined. Other types of motion sensing may be accomplished by replacing physical sensors with optical sensors, some of which employ multiple cameras and customized light sources. The wearable sensor and optical sensor systems utilize sparse data to track motion. With respect to wearable devices, the amount of data received is directly related to the number of sensors and optical sensor solutions utilize images taken to provide depth information which may be susceptible to noise. In order to compensate for sensor error, motion information may be coded in a sparse manner, in which only the locations of few key points are determined. Also, current methods fail to extract the texture information of the subject for rendering.

SUMMARY

An example method of motion control and textured display, comprising, receiving an image, extracting an initial mask of a subject of interest from the image, segmenting the image into the initial mask and a background, determining a color texture of the initial mask, estimating motion of the initial mask to a new mask and merging the new mask and the background into a merged image.

Another method of motion control and textured display, comprising, receiving an initial image, extracting an initial mask of a subject of interest from the initial image, receiving a new image, determining an overlapping area of the initial image and the new image, determining an offset of the initial mask based on at least one of a minimum color difference and a minimum brightness difference within the overlapping area and applying the determined offset to the initial mask to form a new mask.

A further method of motion control and textured display, comprising, receiving an initial image, extracting an initial mask of a subject of interest from the initial image, eroding the initial mask to an erosion mask, dilating the initial mask to a dilation mask, determining a background contour confidence based on the erosion mask and the dilation mask, determining a subject contour confidence based on the erosion mask and the dilation mask, determining a background color confidence based on the erosion mask and the dilation mask, determining a subject color confidence based on the erosion mask and the dilation mask, determining a background affinity based on the background contour confidence, the subject contour confidence, the background color confidence and the subject color confidence, determining a subject affinity based on the background contour confidence, the subject contour confidence, the background color confidence and the subject color confidence and combining the background affinity and the subject affinity.

DETAILED DESCRIPTION OF THE INVENTION

The embodiments listed below are written only to illustrate the applications of this apparatus and method, not to limit the scope. The equivalent form of modifications towards this apparatus and method shall be categorized as within the scope the claims.

Certain terms are used throughout the following description and claims to refer to particular system components. As one skilled in the art will appreciate, different companies may refer to a component and/or method by different names. This document does not intend to distinguish between components and/or methods that differ in name but not in function.

In the following discussion and in the claims, the terms "including" and "comprising" are used in an open-ended fashion, and thus may be interpreted to mean "including, but not limited to . . . ." Also, the term "couple" or "couples" is intended to mean either an indirect or direct connection. Thus, if a first device couples to a second device that connection may be through a direct connection or through an indirect connection via other devices and connections.

Figure 1:
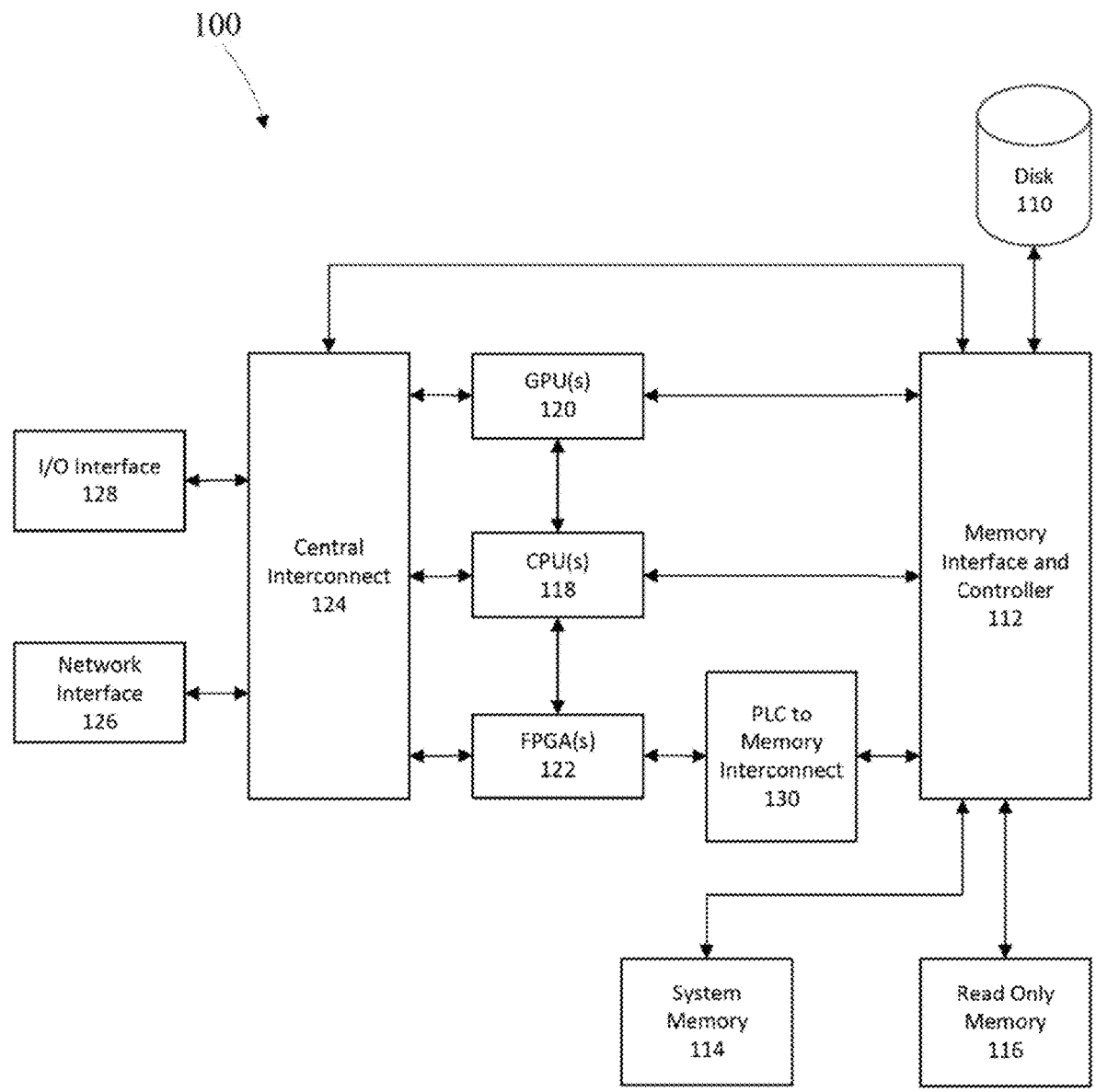
FIG. 1 is a first example system diagram in accordance with one embodiment of the disclosure.

FIG. 1 depicts an example hybrid computational system 100 that may be used to implement neural nets associated with the operation of one or more portions or steps of process 600. In this example, the processors associated with the hybrid system comprise a field programmable gate array (FPGA) 122, a graphical processor unit (GPU) 120 and a central processing unit (CPU) 118.

The CPU 118, GPU 120 and FPGA 122 have the capability of providing a neural net. A CPU is a general processor that may perform many different functions, its generality leads to the ability to perform multiple different tasks, however, its processing of multiple streams of data is limited and its function with respect to neural networks is limited.

A GPU is a graphical processor which has many small processing cores capable of processing parallel tasks in sequence. An FPGA is a field programmable device, it has the ability to be reconfigured and perform in hardwired circuit fashion any function that may be programmed into a CPU or GPU. Since the programming of an FPGA is in circuit form, its speed is many times faster than a CPU and appreciably faster than a GPU.

There are other types of processors that the system may encompass such as an accelerated processing unit (APUs) which comprise a CPU with GPU elements on chip and digital signal processors (DSPs) which are designed for performing high speed numerical data processing. Application specific integrated circuits (ASICs) may also perform the hardwired functions of an FPGA; however, the lead time to design and produce an ASIC is on the order of quarters of a year, not the quick turn-around implementation that is available in programming an FPGA.

The graphical processor unit 120, central processing unit 118 and field programmable gate arrays 122 are connected and are connected to a memory interface controller 112. The FPGA is connected to the memory interface through a programmable logic circuit to memory interconnect 130. This additional device is utilized due to the fact that the FPGA is operating with a very large bandwidth and to minimize the circuitry utilized from the FPGA to perform memory tasks. The memory and interface controller 112 is additionally connected to persistent memory disk 110, system memory 114 and read only memory (RUM) 116.

The system of FIG. t A may be utilized for programming and training the FPGA. The GPO functions well with unstructured data and may be utilized for training, once the data has been trained a deterministic inference model may be found and the CPU may program the FPGA with the model data determined by the GPU.

The memory interface and controller is connected to a central interconnect 124, the central interconnect is additionally connected to the GPU 120, CPU 118 and FPGA 122. The central interconnect 124 is additionally connected to the input and output interface 128 and the network interface 126.

Figure 2:
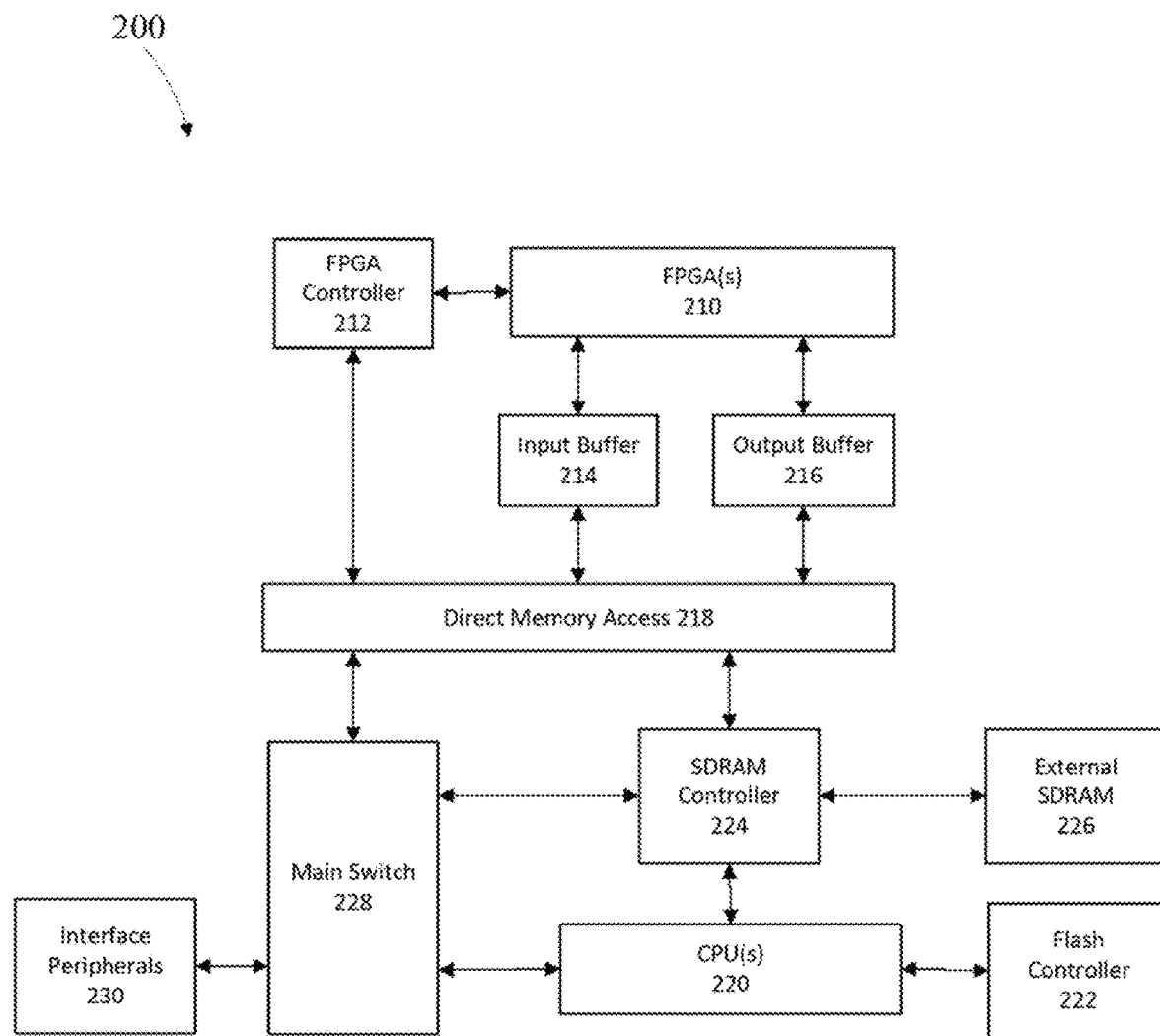
FIG. 2 is a second example system diagram in accordance with one embodiment of the disclosure.

FIG. 2 depicts a second example hybrid computational system 200 that may be used to implement neural nets associated with the operation of one or more portions or steps of process 1000. In this example, the processors associated with the hybrid system comprise a field programmable gate array (FPGA) 210 and a central processing unit (CPU) 220.

The FPGA is electrically connected to an FPGA controller 212 which interfaces with a direct memory access (DMA) 218. The DMA is connected to input buffer 214 and output buffer 216, which are coupled to the FPGA to buffer data into and out of the FPGA respectively. The DMA 218 includes of two first in first out (FIFO) buffers one for the host CPU and the other for the FPGA, the DMA allows data to be written to and read from the appropriate buffer.

On the CPU side of the DMA are a main switch 228 which shuttles data and commands to the DMA. The DMA is also connected to an SDRAM controller 224 which allows data to be shuttled to and from the FPGA to the CPU 220, the SDRAM controller is also connected to external SDRAM 226 and the CPU 220. The main switch 228 is connected to the peripherals interface 230. A flash controller 222 controls persistent memory and is connected to the CPU 220.

One example solution depicted in the instant disclosure makes use of optical information recorded from at least one camera to extract the spatial localization and temporal displacement of a subject of interest in 2D or 3D space. The extracted spatial location and temporal displacement are represented as a dense intensity distribution indicating the subject of interest in the form of a mask. In one example, the system collects radiometric properties of the surface of the subject of interest within the mask, which may be utilized to edit the graphical representation of the subject of interest.

One example solution may utilize a red-blue-green (RGB) camera and machine learning models to infer a motion and a color texture of a subject of interest within the mask. Current image segmentation-based motion sensing lacks accuracy in the motion sensing of high movement areas within the subject of interest such as hand movements or facial expressions. Current solutions lack temporal smoothness which may induce large variances in the temporal domain, resulting in flickering. Current real time segmentation systems have poor precision near the boundary areas, which may result in artifacts.

An example solution includes a segmentation-based motion sensing and texture extraction system which separates a mask of a subject of interest and a background. The solution includes a loss function for the subject of interest within the mask such as a body and components within the mask of the subject of interest such as hands, hair or a face. An intra-frame learning workflow allows the mask to be modified in size, position and rotation from frame to frame, i.e. intra-frame. The proposed solution also includes a mask determination and post-processing of the mask to enhance a contour between the mask and the background. The mask determination may be augmented by online data.

Figure 3:
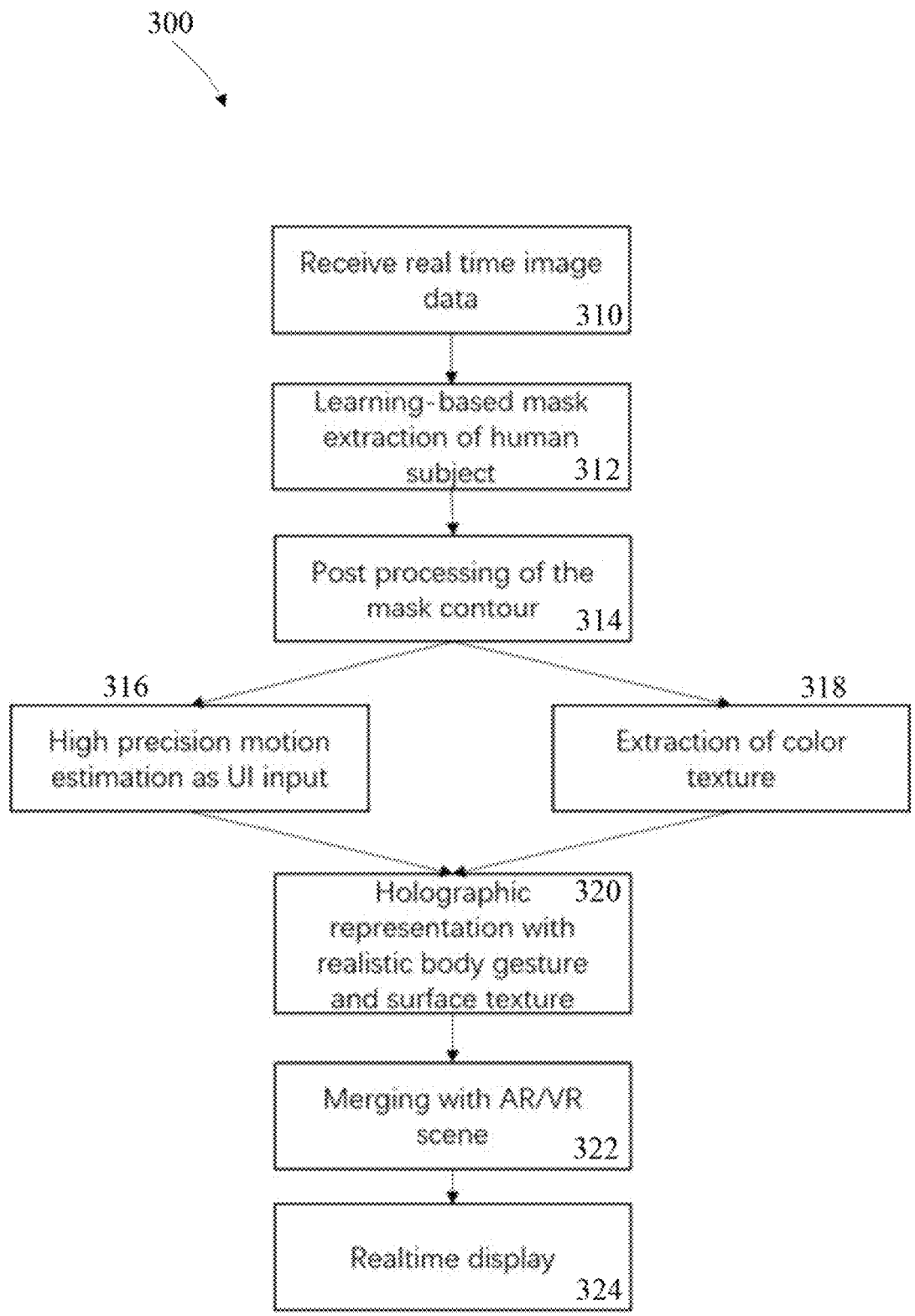
FIG. 3 is an example method workflow in accordance with one embodiment of the disclosure.

A schematic representation of an example workflow 300 is depicted in FIG. 3. The method receives 310 an image from at least one camera, the image may be in real-time. The image undergoes a learning-based mask extraction 312 of a subject of interest to separate the subject of interest from the background. The learning-based mask extraction may include an iterative review of previous masks and augmentation with data located online. A mask is formed about and or around the subject of interest. The mask containing the subject of interest may have sub-components which may be individually reviewed. The method post-processes 314 the mask contour to smooth the contours of the subject of interest within the mask to the background. The method also estimates 316 a motion of the subject of interest within the mask and extracts 318 color textures of the subject of interest within the mask and the background. The motion estimation 316 and the color texture extraction 318 are combined 320 into a holographic representation of the subject of interest having motion and surface textures. The combination may be merged 322 into a scene frame, which may be audio visual or virtual reality and may be displayed 324 in real time.

Specific components of the subject of interest within the mask such as hands, face and hair are complex to segment due to nonlinear local patterns and noise. Current segmentation performs the segmentation task as a holistic homogeneous semantic region. This holistic homogeneous semantic strategy may be inefficient in that that the training occurs on simple regions and complex regions may be largely ignored. One proposed solution includes a subject component loss that allows separated focus on the more complex regions such as hands, face and hair. A local boundary condition error (BCE) loss considers regions within a target component bounding box. Local losses allow training in a hierarchical fashion, breaking loss within the mask into a general body loss and a specific component loss. In the case of a mask containing a human, the body would be one loss and the individual components of the hand, face and hair would be specific component losses. Utilizing designed weight parameters, the losses may be combined together. The resultant formulation is given by:

$$L_{total} = L_{BCE(body)} * W_{body} + L_{BCE(component)} * W_{component}$$

Although a human is referred to in the discussion of the example mask, any type of subject of interest having complex sub-components may also utilize this method of component loss.

Inter-frame learning includes utilizing a predicted new mask from a previous frame to be asserted into the input image as a fourth channel in a learning network; such that the network learns to segment the image with the guidance of an initial mask. Please note that the terms initial mask refer to a previous mask and new mask refers to a mask that follows a previous mask.

Figure 4:
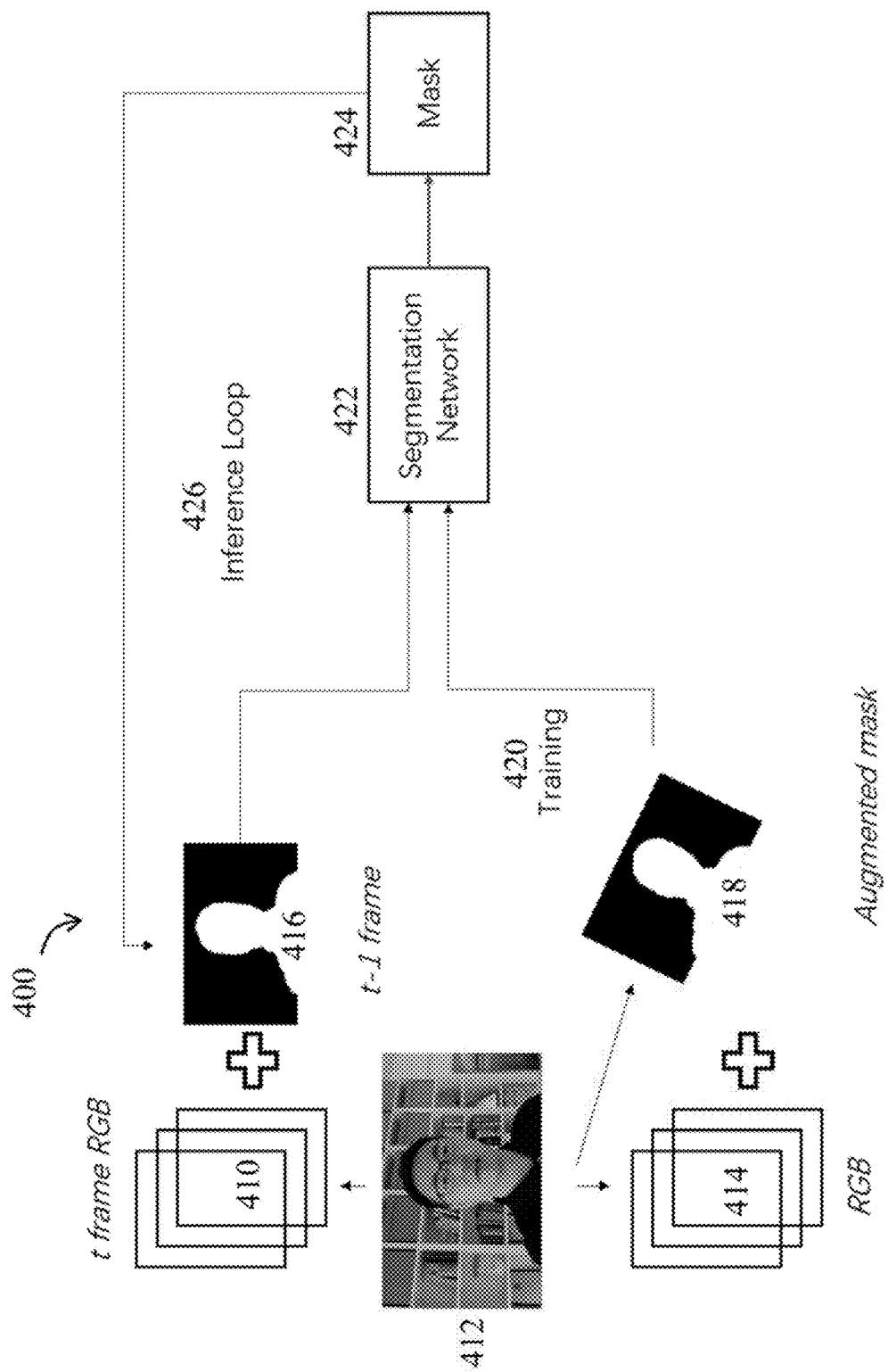
FIG. 4 is an example infra-frame training and inference workflow in accordance with one embodiment of the disclosure.

FIG. 4 depicts an example training and inference workflow of intra-frame learning for temporal consistency enhancement 400. The mask of the subject of interest may change from frame to frame. The change to the mask may involve a movement, rotation or size adjustment of the mask. This change may flow in a progressive way from frame to frame and may be determined. An image taken at time t−1 and yields a t−1 frame 416 that is routed through a segmentation network 422 resulting in an initial mask 424 routed through inference loop 426. An updated image 412 taken at time t yields a t frame RGB 410 image. The subject of interest of the t frame and t−1 should be the same, even though the mask containing the subject of interest may adjust in size, rotation or translation. Therefore, the mask in frame t may be related to the mask in frame t−1. The mask of frame t may be augmented 418 by the adjustment in size, rotation and translation and utilized for training the segmentation network 422. In this way, the segmentation network 422 continuously updates the mask 424 utilizing the inference loop 426 based on a subject of interest within an evolving mask.

The mask may be processed with augmentation operations such as rotation, translation and scaling before being added into a fourth channel of the learning network. In this manner, the network balances the updated RGB image and initial mask such that the new mask is internally consistent with the initial mask to keep temporal stabilization.

The adjustment of training may prevent large variations between initial masks and new masks by temporally smoothing the initial mask and the new mask. The adjustment of training may be non-real-time.

The determination of a mask of a subject of interest is intensive and mask updates are currently performed at a frequency much lower than that of the display such that one mask may be used to render multiple frames. A stationary mask may be unable to address small variations among frames, which may be caused by oscillation of the camera or minor body movement and the like.

The update of masks may be solved utilizing interpolation. After a frame is processed, its brightness map as well as the initial mask may be held in a buffer. When a new frame is obtained, the initial or previous frame may be displaced within a predetermined range and the average brightness difference within the overlapping area may be found. After the frame is received, a minimum difference value may be identified between the initial frame and the new frame. The corresponding frame displacement may then be applied to the initial mask to create a new mask. After the rendering, the new mask and the brightness map may once again stored in the buffer and the loop continues until the termination of the process as shown in FIG. 5.

Figure 5:
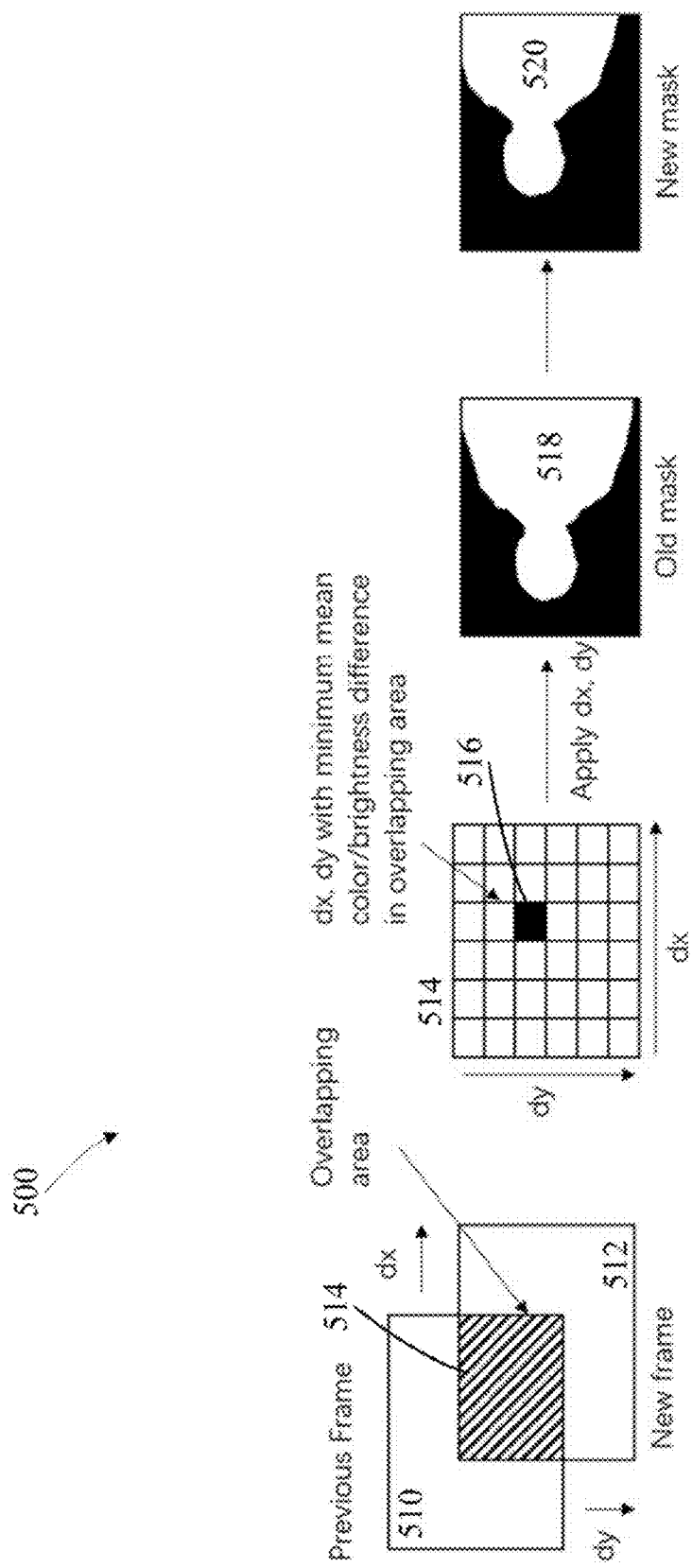
FIG. 5 is another example global mask search in accordance with one embodiment of the disclosure.

FIG. 5 depicts an example global search 500, where the displacement of a mask is obtained by finding the dx and dy value to minimize the mean color difference and or brightness difference within the overlapping area after adjusting the previous frames. The previous frame 510 and the new frame 512 have an overlapping area 514. Within the overlapping area 514 a delta x (dx) and delta y (dy), dxdy 516 is located. The dxdy 516 is then applied to the initial mask 518 to determine the new mask 520.

Restrictions based on the model complexity and input resolution allows the mask of each frame to estimate of the contour of the mask of the subject of interest. To obtain a visually appealing rendering, the color texture needs to be accurate. Inaccuracies in the color texture such as the inclusion of non-subject pixels may result in apparent artifacts on the rendered image. In one example the model assumes that pixels of the same object should have similar colors, and a series of filters are utilized to boost the color texture accuracy near the mask contour.

The proposed system utilizes a learning model to extract a dense mask and a surface texture allowing exaction of the ground truth and prediction of a mask of the subject of interest. The ground truth refers to a pixel comparison to what is there in reality to verify the contents of the pixel in the image.

The proposed system allows training of the learning model via a sequence of frames with a mask of the previous frame serving as an input layer for the next frame and allows the application of different displacements to the previous frame and compares the frame with a latter frame to determine a displacement by minimizing global brightness differences and applies the corresponding displacement to the earlier frame mask. The system training may be non-real-time.

Figure 6:
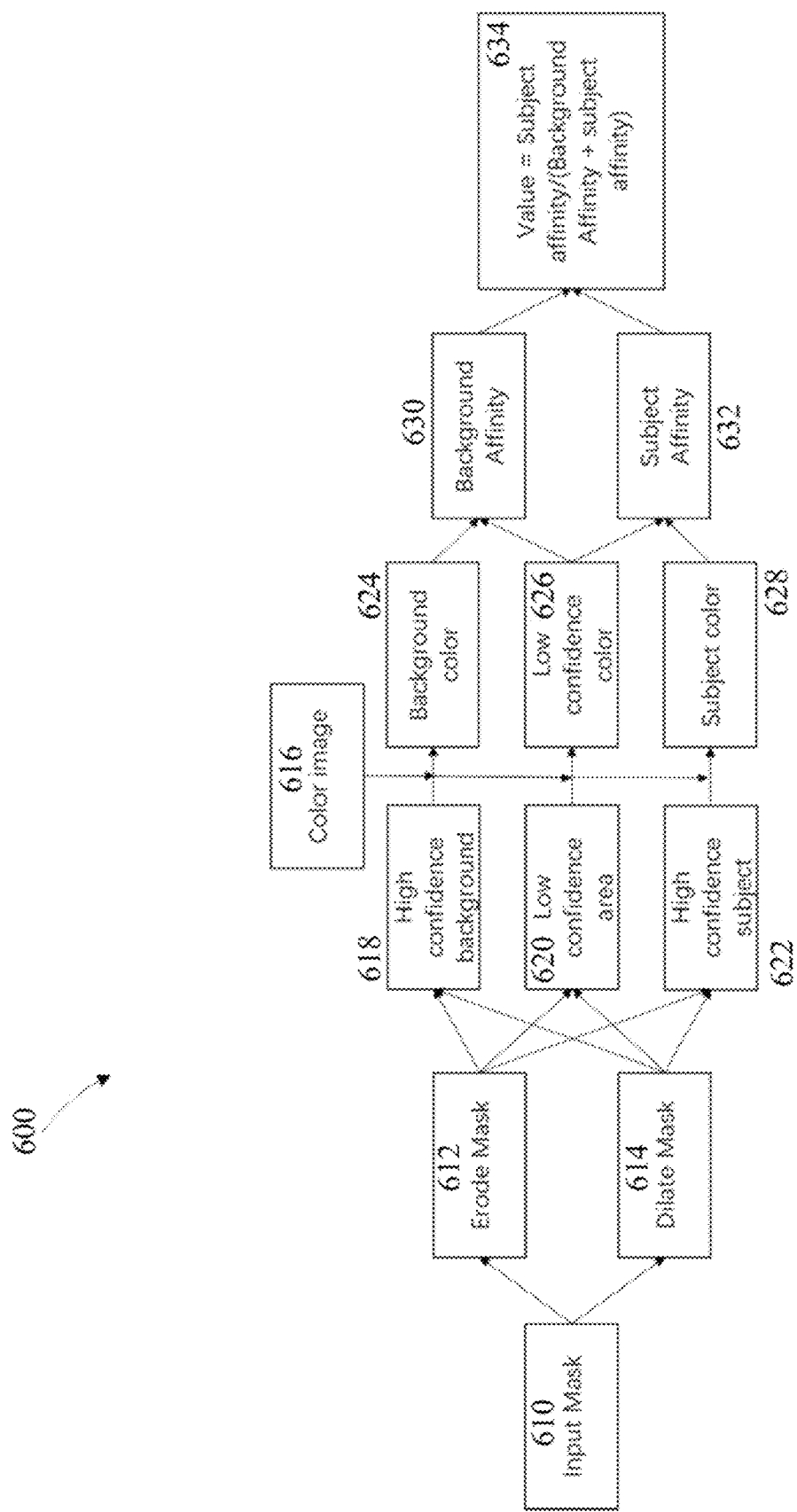
FIG. 6 is another example background affinity and subject affinity workflow in accordance with one embodiment of the disclosure.

The method of determining a mask value near a mask contour according to color affinity to background and subject of interest mask regions is described in FIG. 6. The input mask 610 is independently dilated 614 and eroded 612. For areas that have the same value of both the dilated and eroded images, these are considered high confident pixels and their values are left unchanged 618 and 622. For the pixels that have different values of the dilated and eroded images, they are considered as low confidence pixels 620. The color image 616 is input and the high confidence background color 624, the low confidence color 626 and the subject of interest color 628 are mapped to the color image 616. The background affinity 630 and the subject of interest affinity 632 are determined based on the surrounding high confidence pixels and color and or brightness differences. The value of the pixel may then be determined by comparing the affinities to background 630 and the subject of interest mask 632 leading to a subject affinity and background affinity value which in one example may be the subject affinity divided by the sum of the background affinity and the subject affinity. This example method may increase the smoothness of the pixels within the color space and may reduce the likelihood inclusion of non-subject pixels with distinct colors in the mask.

FIG. 6 depicts an example method to determine the mask value near the contour according to its color affinity to background and subject of interest regions 600. The method comprises inputting 610 an initial mask, which is eroded 612 and dilated 614. The eroded mask may be segregated into a high confidence background 618, low confidence area 620 and high confidence subject 622. The dilated mask may also be segregated into the high confidence background 618, the low confidence area 620 and the high confidence subject 622. The color image 616 may be input into the high confidence background 618 yielding a background color 624. The color image 616 may be input into the low confidence area 620 yielding a low confidence color 626 and the color image 616 may be input into the high confidence subject 622 yielding a subject color 628. The background color 624 and the low confidence color 626 may be combined into a background affinity 630. The subject color 628 and the low confidence color 626 may be combined into a subject affinity 632. The background affinity 630 and the subject affinity 632 may be combined for a final affinity 634.

For pixels within the area of low confidence, their values are updated according to color and or brightness affinity to pixels outside the area. A learning workflow allows enhancement of the sensing accuracy of components of interest within the subject of interest such as the hands and hair. In one example embodiment, the system utilizes post-processing to adjust the color texture.

Figure 7:
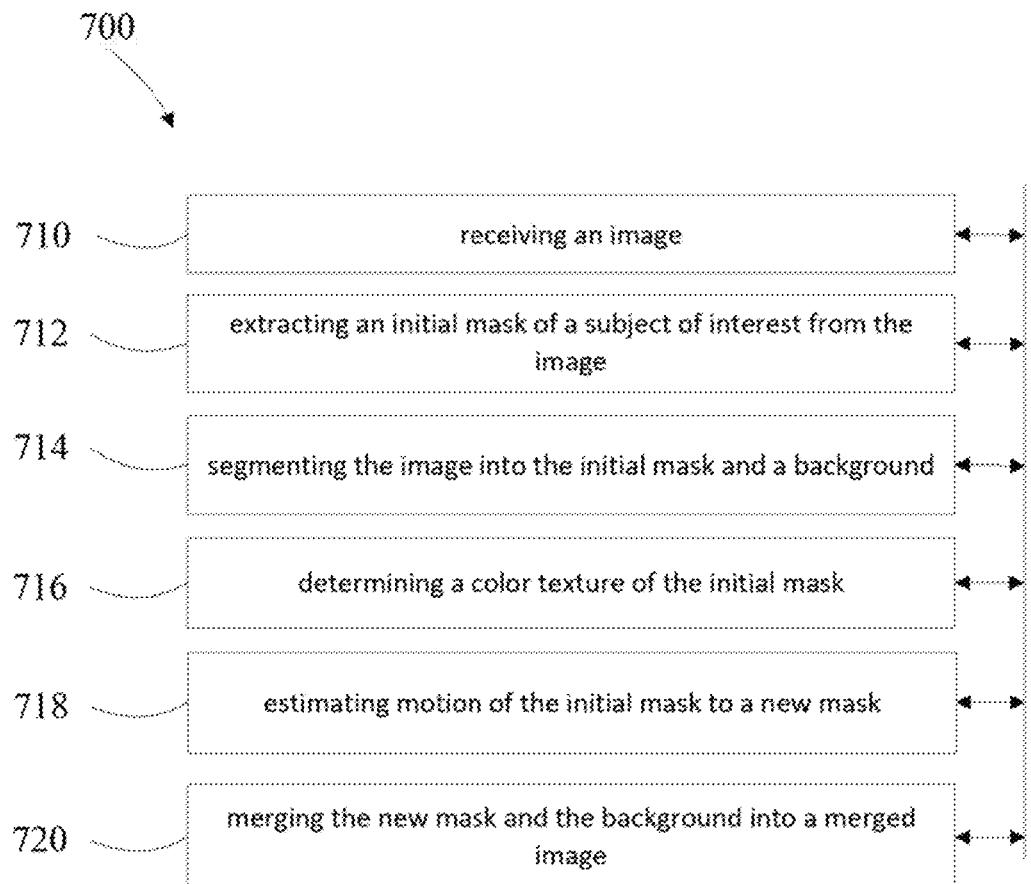
FIG. 7 is a first example method in accordance with one embodiment of the disclosure.

FIG. 7 depicts an example method of motion control and textured display 700, including receiving 710 an image and extracting 712 an initial mask of a subject of interest from the image. The extraction of the initial mask may be based on a learning model augmented by online data. The method segments 714 the image into the initial mask and a background, with the initial mask setting the boundaries of high resolution review. The method determines 716 a color texture of the initial mask, estimates 718 motion of the initial mask to a new mask and merges 720 the new mask and the background into a merged image.

The method may include training the extraction of the initial mask based on a body loss and a component loss and at least one of rotating, translating and scaling the initial mask to the new mask. An augmented new mask may be the output of the at least one of rotating, translating and scaling the initial mask. The method may also determine a minimum mean brightness difference between the initial mask and the new mask and determine a minimum mean color difference between the initial mask and the new mask. The method may erode the initial mask to the new mask to an erosion mask and may dilate the initial mask to the new mask to a dilation mask. Based on the erosion mask and the dilation mask the model may determine a background contour confidence, a subject contour confidence, a background color confidence and a subject color confidence. The model may also determine a background affinity and a subject affinity based on the background contour confidence, the subject contour confidence, the background color confidence and the subject color confidence, where the background affinity and the subject affinity are combined.

Figure 8:
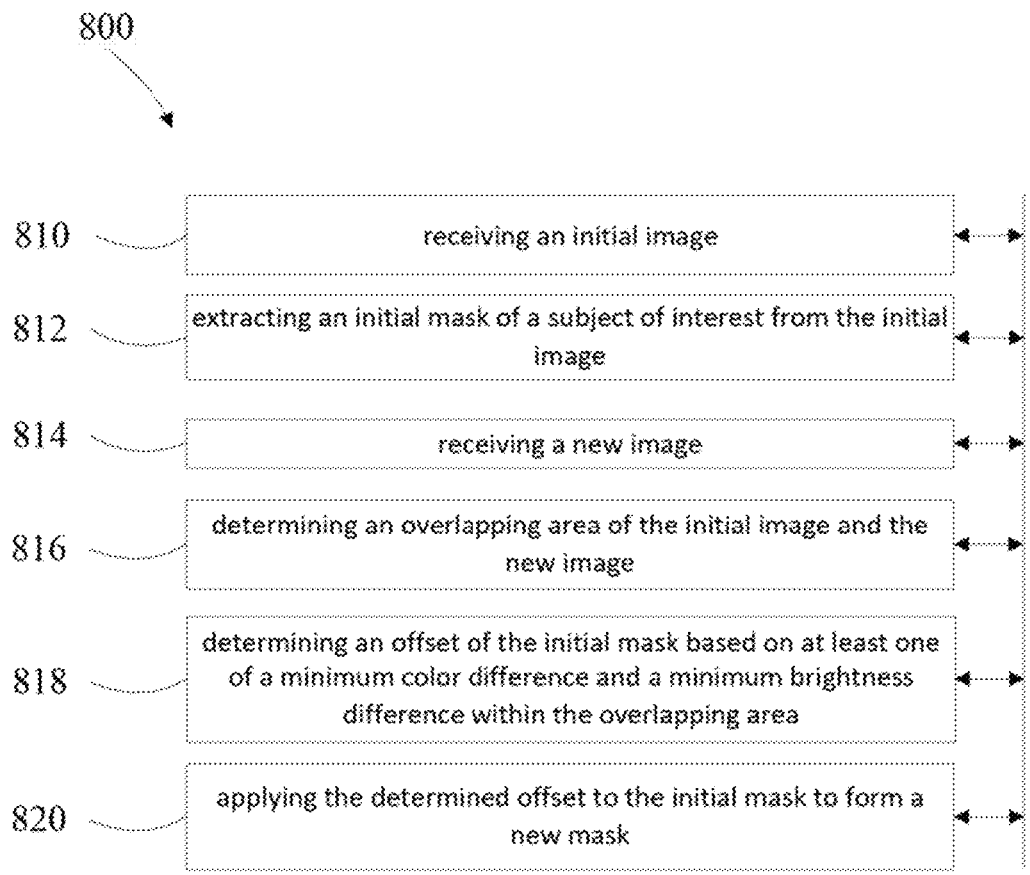
FIG. 8 is a second example method in accordance with one embodiment of the disclosure.

FIG. 8 depicts a method of motion control and textured display 800, comprising, receiving 810 an initial image, extracting 812 an initial mask of a subject of interest from the initial image and receiving 814 a new image. The method further determines 816 an overlapping area of the initial image and the new image, determines 818 an offset of the initial mask based on at least one of a minimum color difference and a minimum brightness difference within the overlapping area and applies 820 the determined offset to the initial mask to form a new mask.

Figure 9:
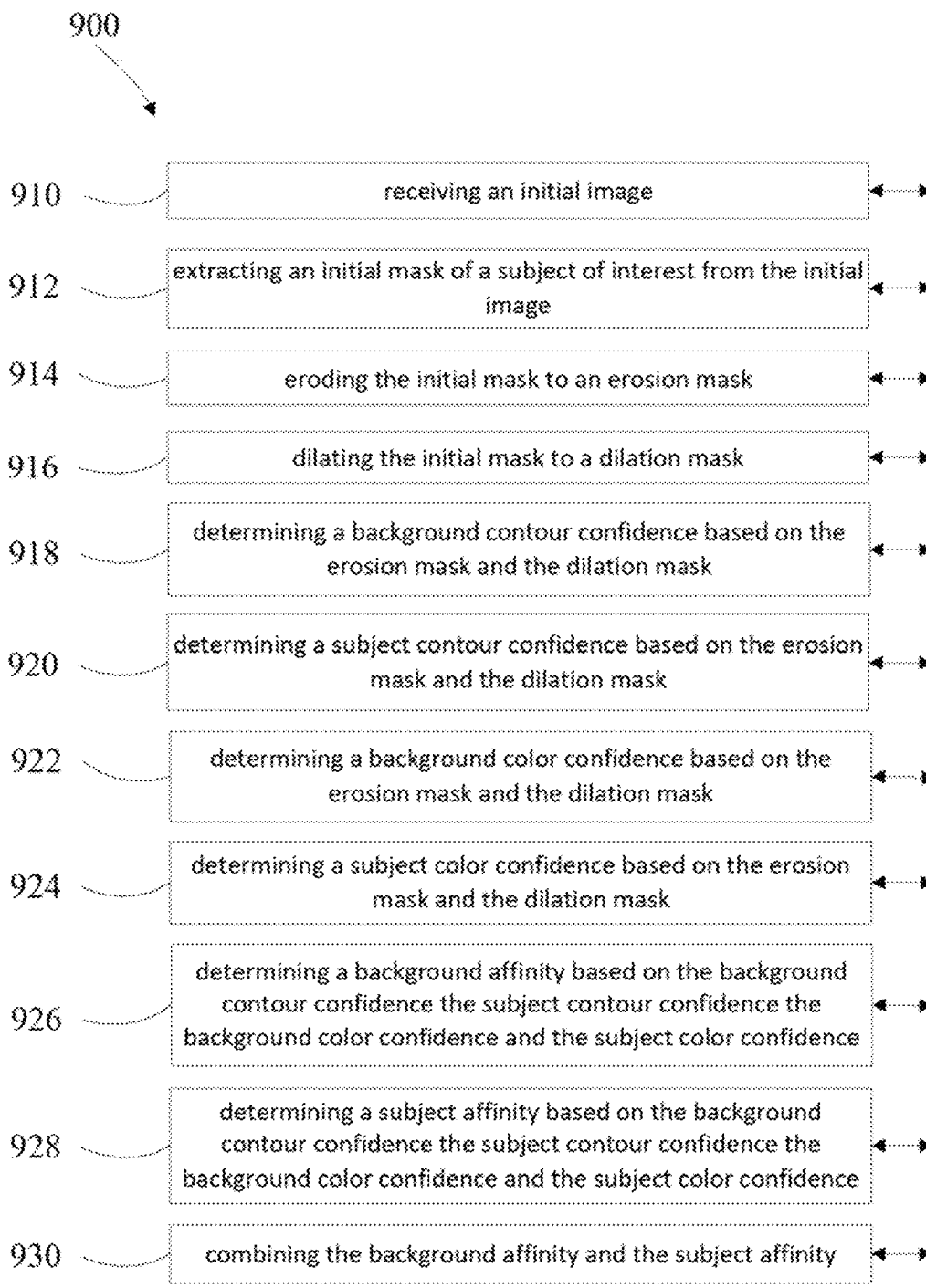
FIG. 9 is a third example method in accordance with one embodiment of the disclosure.

FIG. 9 depicts a method of motion control and textured display 900, comprising, receiving 910 an initial image, extracting 912 an initial mask of a subject of interest from the initial image, eroding 914 the initial mask to an erosion mask and dilating 916 the initial mask to a dilation mask. The method determines 918 a background contour confidence based on the erosion mask and the dilation mask and determines 920 a subject contour confidence based on the erosion mask and the dilation mask. The method also determines 922 a background color confidence based on the erosion mask and the dilation mask and determines 924 a subject color confidence based on the erosion mask and the dilation mask. The method additionally determines 926 a background affinity based on the background contour confidence, the subject contour confidence, the background color confidence and the subject color confidence. The method further includes determining 928 a subject affinity based on the background contour confidence, the subject contour confidence, the background color confidence and the subject color confidence and combining 930 the background affinity and the subject affinity.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the system. Skilled artisans may implement the described functionality in varying ways for each particular application. Various components and blocks may be arranged differently (e.g., arranged in a different order, or partitioned in a different way) without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects may be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code may be construed as a processor programmed to execute code or operable to execute code.

A phrase such as an "aspect" does not imply that such aspect is essential to the subject technology or that such aspect applies to configurations of the subject technology. A disclosure relating to an aspect may apply to configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to configurations of the subject technology. A disclosure relating to an embodiment may apply to embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to configurations of the subject technology. A disclosure relating to a configuration may apply to configurations, or one or more configurations. A configuration may provide one or more examples. A phrase such as a "configuration" may refer to one or more configurations and vice versa.

The word "example" is used herein to mean "serving as an example or illustration." Any aspect or design described herein as "example" is not necessarily to be construed as preferred or advantageous over other aspects or designs.

Structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

References to "one embodiment," "an embodiment," "some embodiments," "various embodiments", or the like indicate that a particular element or characteristic is included in at least one embodiment of the invention. Although the phrases may appear in various places, the phrases do not necessarily refer to the same embodiment. In conjunction with the present disclosure, those skilled in the art may be able to design and incorporate any one of the variety of mechanisms suitable for accomplishing the above described functionalities.

It is to be understood that the disclosure teaches just one example of the illustrative embodiment and that many variations of the invention may easily be devised by those skilled in the art after reading this disclosure and that the scope of then present invention is to be determined by the following claims.

What is claimed is:

1. A method of motion control and textured display, comprising:
   receiving an initial image;
   extracting an initial mask of a subject of interest from the initial image;
   segmenting the image into the initial mask and a background;
   determining a color texture of the initial mask;
   estimating motion of the initial mask to a new mask;
   merging the new mask and the background into a merged image;
   training the extraction of the initial mask based on a body loss and a component loss;
   at least one of rotating, translating and scaling the initial mask to the new mask;
   determining a minimum mean brightness difference between the initial mask and the new mask;
   determining a minimum mean color difference between the initial mask and the new mask;
   eroding the initial mask to an erosion mask;
   dilating the initial mask to a dilation mask;
   determining a background contour confidence based on the erosion mask and the dilation mask;
   determining a subject contour confidence based on the erosion mask and the dilation mask;
   determining a background color confidence based on the erosion mask and the dilation mask;
   determining a subject color confidence based on the erosion mask and the dilation mask;
   determining a background affinity based on the background contour confidence, the subject contour confidence, the background color confidence and the subject color confidence;
   determining a subject affinity based on the background contour confidence, the subject contour confidence, the background color confidence and the subject color confidence; and
   combining the background affinity and the subject affinity.

2. A method of motion control and textured display, comprising:
   receiving an in image;
   extracting an initial mask of a subject of interest from the initial image;
   eroding the initial mask to an erosion mask;
   dilating the initial mask to a dilation mask;
   determining a background contour confidence lased on the erosion mask and the dilation mask;
   determining a subject contour confidence based on the erosion mask and the dilation mask;
   determining a background color confidence based on the erosion mask and the dilation mask;
   determining a subject color confidence based on the erosion mask and the dilation mask;
   determining a background affinity based on the background contour confidence, the subject contour confidence, the background color confidence and the subject color confidence;
   determining a subject affinity based on the background contour confidence, the subject contour confidence, the background color confidence and the subject color confidence; and
   combining the background affinity and the subject affinity.

3. A method of motion control and textured display, comprising:
   receiving an initial image;
   extracting an initial mask of a subject of interest from the initial image;
   receiving a new image;
   determining an overlapping area of the initial image and the new image;
   determining an offset of the initial mask based on a minimum color difference and a minimum brightness difference within the overlapping area;

applying the determined offset to the initial mask to form a new mask; and storing the new mask in a buffer.

\* \* \* \* \*